United States Patent
Zhao

(10) Patent No.: US 10,472,244 B2
(45) Date of Patent: Nov. 12, 2019

(54) CARBON PLATE AND MANUFACTURING PROCESS THEREOF

(71) Applicant: Xingan Zhao, Zhejiang (CN)

(72) Inventor: Xingan Zhao, Zhejiang (CN)

( * ) Notice: Subject to any disclaimer, the term of this patent is extended or adjusted under 35 U.S.C. 154(b) by 0 days.

(21) Appl. No.: 15/739,758

(22) PCT Filed: Sep. 28, 2015

(86) PCT No.: PCT/CN2015/090903
§ 371 (c)(1),
(2) Date: Dec. 25, 2017

(87) PCT Pub. No.: WO2016/206211
PCT Pub. Date: Dec. 29, 2016

(65) Prior Publication Data
US 2018/0186647 A1 Jul. 5, 2018

(30) Foreign Application Priority Data
Jun. 25, 2015 (CN) .......................... 2015 1 0358009

(51) Int. Cl.
| | |
|---|---|
| *C04B 35/52* | (2006.01) |
| *C01B 32/354* | (2017.01) |
| *C04B 26/02* | (2006.01) |
| *C04B 35/626* | (2006.01) |
| *C04B 35/63* | (2006.01) |
| *C04B 35/634* | (2006.01) |
| *C08K 3/04* | (2006.01) |

(52) U.S. Cl.
CPC ............ *C01B 32/382* (2017.08); *C04B 26/02* (2013.01); *C04B 35/521* (2013.01); *C04B 35/6268* (2013.01); *C04B 35/62675* (2013.01); *C04B 35/6303* (2013.01); *C04B 35/634* (2013.01); *C08K 3/04* (2013.01)

(58) Field of Classification Search
CPC ..... C04B 35/52; C04B 35/521; C04B 35/522; C04B 35/532; C04B 35/536
USPC .......................................... 501/99, 100, 101
See application file for complete search history.

(56) References Cited

U.S. PATENT DOCUMENTS

| | | | | |
|---|---|---|---|---|
| 4,188,279 A | * | 2/1980 | Yan ....................... | C04B 35/532 106/278 |
| 5,247,005 A | * | 9/1993 | von Bonin .............. | F28F 21/02 264/109 |
| 6,156,697 A | * | 12/2000 | Gadkaree ................. | B01J 20/20 502/427 |
| 6,228,803 B1 | * | 5/2001 | Gadkaree ................. | B01J 20/20 428/402 |
| 2004/0143068 A1 | * | 7/2004 | Honda ................... | C08F 259/08 525/199 |
| 2006/0148934 A1 | * | 7/2006 | Miyama ................... | C08J 3/203 524/13 |
| 2012/0276392 A1 | * | 11/2012 | Takahashi ............... | B32B 15/08 428/418 |

FOREIGN PATENT DOCUMENTS

| | | |
|---|---|---|
| CN | 1384263 | 12/2002 |
| CN | 1786082 | 6/2006 |
| CN | 101014462 | 8/2007 |
| CN | 101284926 | 10/2008 |
| CN | 102237532 | 11/2011 |
| CN | 104201391 | 12/2014 |
| EP | 1384558 | 1/2004 |

OTHER PUBLICATIONS

"International Search Report (Form PCT/ISA/210)", dated Mar. 31, 2016, with English translation thereof, pp. 1-4.
"Search Report of Europe Counterpart Application", dated Dec. 21, 2018, p. 1-p. 7.

* cited by examiner

*Primary Examiner* — Noah S Wiese
(74) *Attorney, Agent, or Firm* — JCIPRNET

(57) ABSTRACT

A carbon plate including the following components in weight percentage: 31.5% to 91% of carbon powder, 3% to 25% of resin, 3% to 30% of plant fiber, 0.5% to 2.5% of fire retardant, 0.5% to 3% of dispersing agent, 1% to 3% of zeolite powder, and 1% to 5% of tea stem residue. A manufacturing process for the carbon plate including: mixing raw materials according to a proportion, placing the raw materials into a stirrer, and stirring the raw materials to uniformity; feeding a material obtained; performing heating; maintaining the pressure.

7 Claims, No Drawings

CARBON PLATE AND MANUFACTURING PROCESS THEREOF

CROSS-REFERENCE TO RELATED APPLICATION

This application is a 371 of international application of PCT application serial no. PCT/CN2015/090903, filed on Sep. 28, 2015, which claims the priority benefit of China application no. 201510358009.4, filed on Jun. 25, 2015. The entirety of each of the above-mentioned patent applications is hereby incorporated by reference herein and made a part of this specification.

BACKGROUND OF THE INVENTION

1. Field of the Invention

The present invention relates to a field of plate manufacturing technologies, and in particular, to a carbon plate and a manufacturing process thereof.

2. Description of Related Art

In recent years, furniture of different types and different materials are launched in the furniture market, affecting consumers' choices. Many merchants, in order to make the furniture looks nice and profits unfairly, add harmful substances to the furniture. As a result, consumers' health is influenced at variable degrees. A problem of commercially available carbon plates is that the carbon plates cause serious pollution and are detrimental to health.

SUMMARY OF THE INVENTION

The present invention is directed to a carbon plate and a manufacturing process thereof, so as to resolve a problem that the conventional carbon plates cause serious pollution and are detrimental to health.

A carbon plate, including the following components (in weight percentage): 31.5% to 91% of 30-150 mesh carbon powder, 3% to 25% of resin, 3% to 30% of plant fiber, 0.5% to 2.5% of fire retardant, 0.5% to 3% of dispersing agent, 1% to 3% of zeolite powder, and 1% to 5% of tea stem residue.

A carbon plate, including the following components (in weight percentage): 31.5% of 30-150 mesh carbon powder, 25% of resin, 30% of plant fiber, 2.5% of fire retardant, 3% of dispersing agent, 3% of zeolite powder, and 5% of tea stem residue.

A carbon plate, including the following components (in weight percentage): 62% of 30-150 mesh carbon powder, 15% of resin, 15% of plant fiber, 1.5% of fire retardant, 1.5% of dispersing agent, 2% of zeolite powder, and 3% of tea stem residue.

A carbon plate, including the following components (in weight percentage): 91% of 30-150 mesh carbon powder, 3% of resin, 3% of plant fiber, 0.5% of fire retardant, 0.5% of dispersing agent, 1% of zeolite powder, and 1% of tea stem residue.

A manufacturing process for a carbon plate, including the following steps: step 1: mixing raw materials according to a proportion, placing the raw materials into a stirrer, and stirring the raw materials to uniformity; step 2: feeding a material obtained from the step 1; step 3: performing heating; and step 4: maintaining the pressure.

In the step 3, a heating temperature is 10° C. to 180° C., and a time of the heating lasts 2 mins to 20 mins.

In the step 4, the pressure is maintained at a nominal pressure (PN) equal to or greater than 10 MPa, and a time of the pressure maintaining lasts 2 mins to 30 mins.

Compared with the prior art, beneficial effects of the present invention are: the carbon plate according to the present invention is high in hardness, can withstand pressure that is at least 30% higher than that can be withstand by a common carbon plate, is abrasion resistant, has a buffering capacity, is small in deformation after moisture absorption, and does not contain any harmful substance. Compositions of the carbon powder are selected to further increase functions of absorbing harmful substances such as sulphide, nitride, formaldehyde, benzene, and phenol, and functions of moisture absorption and moisture-proof, moisture desorption, and odor removal. In particular, the absorption-degradation rate of ambient formaldehyde for 24 hours reaches 43%. Therefore, the carbon plate is environmental friendly.

DESCRIPTION OF THE EMBODIMENTS

Specific processing processes of the present invention are further described in detail with reference to the process procedures:

The present invention discloses a carbon plate, including the following components (in weight percentage): 31.5% to 91% of 30-150 mesh carbon powder, 3% to 25% of resin, 3% to 30% of plant fiber, 0.5% to 2.5% of fire retardant, 0.5% to 3% of dispersing agent, 1% to 3% of zeolite powder, and 1% to 5% of tea stem residue.

Types of the carbon plate according to the present invention may be furniture panels or decorative plates of various shapes such as a square plate, a circular plate, an oval plate, and a strip-shaped plate. The carbon powder may be bamboo charcoal powder, charcoal powder, or the like. Alternatively, the carbon powder may be replaced with a carbide material that is also environmental-friendly.

The present invention further discloses a manufacturing process for a carbon plate, including the following steps: step 1: mixing raw materials according to a proportion, placing the raw materials into a stirrer, and stirring the raw materials to uniformity; step 2: feeding a material obtained from the step 1; step 3: performing heating, wherein a heating temperature is 10° C. to 180° C., and a time of the heating lasts 2 mins to 20 mins; and step 4: maintaining the pressure, wherein the pressure is maintained at a nominal pressure (PN) equal to or greater than 10 MPa, and a time of the pressure maintaining lasts 2 mins to 30 mins.

Embodiment 1

A carbon plate, including the following components (in weight percentage): 31.5% of 30-150 mesh carbon powder, 25% of resin, 30% of plant fiber, 2.5% of fire retardant, 3% of dispersing agent, 3% of zeolite powder, and 5% of tea stem residue.

A manufacturing process for a carbon plate, including the following steps: step 1: mixing raw materials according to a proportion, placing the raw materials into a stirrer, and stirring the raw materials to be even; step 2: feeding a material obtained from the step 1; step 3: performing heating at 10° C. for 2 min; and step 4: maintaining the pressure for 2 min at a PN equal to or greater than 10 MPa, that is, pressure equal to or greater than 100 kg. Zeolite powder and tea stem residue increase the absorption-degradation function. A detection result was: the specific surface area was 275 m$^2$/g, the pore area of charcoal was 210 m$^2$/g, the methylene blue absorption value was 112 mg/g, the ethylene gas absorption value was 3.55 ml/g, the loss on ignition was 11.8%, the pH value was 5.4, the water content was 4.4%, and the infrared emissivity was 42%. The obtained carbon plate had high hardness and did not contain any harmful substance. Therefore, the carbon plate was environmental friendly.

Embodiment 2

A carbon plate, including the following components (in weight percentage): 91% of 30-150 mesh carbon powder, 3% of resin, 3% of plant fiber, 0.5% of fire retardant, 0.5% of dispersing agent, 1% of zeolite powder, and 1% of tea stem residue.

A manufacturing process for a carbon plate, including the following steps: step 1: mixing raw materials according to a proportion, placing the raw materials into a stirrer, and stirring the raw materials to be even; step 2: feeding a material obtained from the step 1; step 3: performing heating at 180° C. for 20 min; and step 4: maintaining the pressure for 30 min at a PN equal to or greater than 10 MPa, that is, pressure equal to or greater than 100 kg. Zeolite powder and tea stem residue increase the absorption-degradation function. A detection result was: the specific surface area was 287 $m^2/g$, the pore area of charcoal was 228 $m^2/g$, the methylene blue absorption value was 107 mg/g, the ethylene gas absorption value was 3.47 ml/g, the loss on ignition was 11.6%, the pH value was 5.3, the water content was 4.8%, and the infrared emissivity was 41%. The obtained carbon plate had high hardness and did not contain any harmful substance. Therefore, the carbon plate was environmental friendly.

Embodiment 3

A carbon plate, including the following components (in weight percentage): 62% of 30-150 mesh carbon powder, 15% of resin, 15% of plant fiber, 1.5% of fire retardant, 1.5% of dispersing agent, 2% of zeolite powder, and 3% of tea stem residue.

A manufacturing process for a carbon plate, including the following steps: step 1: mixing raw materials according to a proportion, placing the raw materials into a stirrer, and stirring the raw materials to be even; step 2: feeding a material obtained from the step 1; step 3: performing heating at 90° C. for 10 min; and step 4: maintaining the pressure for 15 min at a PN equal to or greater than 10 MPa, that is, pressure equal to or greater than 100 kg. Zeolite powder and tea stem residue increase the absorption-degradation function. The obtained carbon plate had high hardness and did not contain any harmful substance. Therefore, the carbon plate was environmental friendly.

A detection result of the present invention was: the specific surface area was 280 $m^2/g$, the pore area of charcoal was 216 $m^2/g$, the methylene blue absorption value was 110 mg/g, the ethylene gas absorption value was 3.45 ml/g, the loss on ignition was 11.3%, the pH value was 5.3, the water content was 4.6%, and the infrared emissivity was 43%.

The present invention provides a new type of a carbon plate and a manufacturing process thereof. The carbon plate according to the present invention is high in hardness, can withstand pressure that is at least 30% higher than that can be withstand by a common carbon plate, is abrasion resistant, has a buffering capacity, and does not contain any harmful substance. In addition, the carbon plate has functions of absorbing harmful substances such as sulphide, nitride, formaldehyde, benzene, and phenol, and strong functions of moisture absorption and moisture-proof, moisture desorption, and odor removal. Therefore, the carbon plate is environmental friendly.

For a person skilled in the art, it is obvious that the present invention is not limited to details of the foregoing exemplary embodiments, and the present invention can be implemented in other specific forms without departing from the spirit or basic features of the present invention. Therefore, embodiments should be considered as exemplary and non-limiting, and the scope of the present invention is limited by the appended claims rather than the foregoing descriptions. Therefore, all changes that fall within the meaning and scope of equivalents of the claims are included in the present invention. Any numeral in the accompanying drawings in the claims should not be considered as a limitation to the related claims.

In addition, it should be understood that although the specification is described according to the implementations, it does not indicate that each implementation merely includes one independent technical solution. The description manner of the specification is merely for clear description. A person skilled in the art should consider the specification as a whole, and the technical solutions in the embodiments may be properly combined to form other implementations understandable by a person skilled in the art.

What is claimed is:

1. A carbon plate, comprising the following components (in weight percentage):
   31.5% to 91% of 30-150 mesh carbon powder,
   3% to 25% of resin,
   3% to 30% of plant fiber,
   0.5% to 2.5% of fire retardant,
   0.5% to 3% of dispersing agent,
   1% to 3% of zeolite powder, and
   1% to 5% of discarded tea stems.

2. The carbon plate according to claim 1, wherein comprises the following components (in weight percentage):
   31.5% of 30-150 mesh carbon powder,
   25% of resin,
   30% of plant fiber,
   2.5% of fire retardant,
   3% of dispersing agent,
   3% of zeolite powder, and
   5% of discarded tea stems.

3. The carbon plate according to claim 1, wherein comprises the following components (in weight percentage):
   62% of 30-150 mesh carbon powder,
   15% of resin,
   15% of plant fiber,
   1.5% of fire retardant,
   1.5% of dispersing agent,
   2% of zeolite powder, and
   3% of discarded tea stems.

4. The carbon plate according to claim 1, wherein comprises the following components (in weight percentage):
   91% of 30-150 mesh carbon powder,
   3% of resin,
   3% of plant fiber,
   0.5% of fire retardant,
   0.5% of dispersing agent,
   1% of zeolite powder, and
   1% of discarded tea stems.

5. A method of manufacturing a carbon plate, comprising:
   mixing and stirring raw materials listed in the carbon plate of claim 1 to form a uniform mixture;

feeding the uniform mixture;
heating the uniform mixture at a temperature; and
compressing the uniform mixture at a nominal pressure.

6. The method of claim 5, wherein the uniform mixture is heated at the temperature of 10-180° C. for 2-20 minutes.

7. The method of claim 5, wherein the uniform mixture is compressed at the nominal pressure of 10 MPa or more for 2-30 minutes.

* * * * *